United States Patent [19]

Stary

[11] Patent Number: 5,170,693

[45] Date of Patent: Dec. 15, 1992

[54] ROTARY ACTUATOR DEVICE WITH A FREE FLOATING PISTON

[76] Inventor: Gary M. Stary, 636 Thorn Hollow Dr., Coraopolis, Pa. 15108

[21] Appl. No.: 692,328

[22] Filed: Apr. 26, 1991

[51] Int. Cl.[5] ............................................. F01B 25/26
[52] U.S. Cl. ......................................... 92/5 R; 92/32; 92/129; 92/165 R; 251/63.4
[58] Field of Search .................. 92/31, 32, 85 R, 129, 92/165 R, 61, 62, 75, 5 R; 251/62, 63.4 X, 63.5, 63.6

[56] References Cited

U.S. PATENT DOCUMENTS

| | | | |
|---|---|---|---|
| 3,975,992 | 8/1976 | Cagle | 92/129 |
| 4,196,654 | 4/1980 | Stearns | 92/31 |
| 4,216,703 | 8/1980 | Schoeneweis | 92/75 |
| 4,356,841 | 11/1982 | Milberger | 92/33 |
| 4,585,207 | 4/1986 | Shelton | 92/62 |
| 4,744,386 | 5/1988 | Frazer | 92/5 R |
| 4,934,632 | 6/1990 | Golden | 92/62 |

FOREIGN PATENT DOCUMENTS

| | | | |
|---|---|---|---|
| 1910861 | 3/1969 | Fed. Rep. of Germany | 92/31 |
| 1260233 | 3/1961 | France | 92/62 |
| 213504 | 12/1968 | U.S.S.R. | 92/129 |

Primary Examiner—Thomas E. Denion
Attorney, Agent, or Firm—Kirkpatrick & Lockhart

[57] ABSTRACT

A pressure controlled actuator mechanism is disclosed for imparting rotary control motion to devices, such as valves, having rotary control means. The actuator includes a free-floating piston movable and concentrically disposed within an airtight cylindrical housing. A non-rotating receptacle, having helically spiralled recesses therein, is attached to a support member that is adapted to move in response to the free-floating piston. A rotatable shaft, one end of which mates with the helically spiralled recesses of the receptacle, is attached at its other end to a device having a rotary control means. A downward stroke of the receptacle rotates the shaft and activates the device. The support member is spring biased to return the free-floating piston to a starting position. In an alternative embodiment, the free floating piston is movably and concentrically attached to the support member for travel therewith. In this embodiment, a second pressure medium is introduced into the housing to cause the piston and support member to return to a starting position.

22 Claims, 10 Drawing Sheets

ROTARY ACTUATOR DEVICE WITH A FREE FLOATING PISTON

BACKGROUND OF THE INVENTION

1. Field of the Invention

The present invention relates to control apparatus for providing a rotary motion and, in particular, to apparatus for imparting rotary control motion to rotary valves.

2. Description of the Invention Background

Various methods and devices for imparting rotary motion to rotary actuated devices are known in the process control industry. For example, ball and butterfly valves that are used for controlling the flow of a myriad of liquid materials ranging from milk to unrefined oil are commonly controlled by such actuators. In addition, rotary actuators have also been used to impart rotary motion to indexing tables on small part assembly lines in the electronics industry. In general, rotary actuators have also been used in a plethora of other process and assembly operations requiring rotary motion.

Typical rotary actuation devices, such as those disclosed in U.S. Pat. Nos. 3,602,478, 3,985,151 and 4,325,535, generally consist of an airtight housing having a flexible diaphragm fixed therein. A pressure medium is introduced into the housing to thereby cause the diaphragm to flex and impart a linear motion. This linear motion is thereafter converted to rotational motion through the use of conventional ballscrews, linkages or splined shaft connections. Such devices are usually large and cumbersome and generally require more upkeep and replacement parts than the devices they are designed to control.

The prior designs have disadvantages in several respects. In the previous diaphragm operated designs, the diaphragm is fixed to the airtight housing by a series of fasteners that extend around the diaphragm's perimeter. Constant cycling and flexure of the diaphragm causes localized stresses to build up in the diaphragm material around the points of attachment. Continued cycling of the diaphragm eventually causes cracks or ruptures to develop in the diaphragm material. Such ruptures permit the pressure medium to pass through the diaphragm without causing the diaphragm to impart the requisite linear motion thereby rendering the actuator inoperable. To replace the diaphragm, a large number of retaining bolts usually must be removed. This operation is time consuming and requires the use of various hand tools. Often, the actuator is mounted in a cramped area that is not conducive to the manipulation of hand tools which can complicate the diaphragm's removal and thereby lengthen the repair time.

In most prior devices, the diaphragm is enclosed within an airtight metal chamber that affords no visual access for monitoring the diaphragm's integrity. Therefore, in devices of this type, actuator failure cannot be prevented by routine maintenance inspections unless the actuator is taken out of service and disassembled.

In another form of prior art remote control valve operators, such as shown in U.S. Pat. Nos. 2,998,805 or 4,647,003, the valve operator includes a chamber having a movable piston therein and means for applying fluid pressure on each side of the piston to cause its linear displacement. The piston is directly attached to mechanical means for translating the linear displacement of the piston into rotary motion.

I have become aware that such forms of valve operators are also fraught with serious shortcomings. In particular, both the machining of the inner wall of the cylinder and the outer edge of the piston must be exceptionally accurate to avoid binding of the piston. Also, rotational forces on the piston may cause it to rotate slightly to cause excessive wear on the piston seal or on the cylinder wall. In addition, the mechanical components connected to the piston create forces thereon which prevent perfectly concentric movement of the piston in the cylinder.

The present invention is directed toward an improved design for actuating devices having rotary control means which overcomes, among others, the above discussed problems and provides for a more reliable and maintainable means of rotary actuation.

SUMMARY OF THE INVENTION

In accordance with the present invention, an actuator is provided which includes mechanism for imparting rotary control motion to devices having rotary control means. The actuator mechanism includes a free floating piston that is concentrically disposed within a cylindrical housing. The housing is threadably connected to a base member which in combination with the housing creates an airtight enclosure. A pressure medium such as air is introduced into the housing on one side of the free floating piston creating a pressure differential between the two sides of the piston sufficient to cause the piston to move within the housing in a linear direction. A piston support member is slideably mounted to the base and is positioned contiguously to, but, in one embodiment of the invention, not attached to, the free floating piston to permit the transfer of the free floating piston's linear movement to a splined shaft connection that is situated within the base member. The splined shaft extends through the base member and is adapted for connection to the control stem of a device having rotary control means, such as a ball or butterfly valve. A compression spring is provided between the piston support plate and the base member to return the free floating piston and piston support plate to a starting position within the housing when the pressure medium is reduced to a value such that the force of the spring causes the piston to move in a direction from the base member.

In an alternate embodiment of the present invention, two-directional piston control is achieved by alternately introducing the pressure medium on one side of the piston and the other. In this embodiment, however, the piston is loosely attached to the piston support plate to allow movement, both rotationally and in the direction of piston movement.

Because the piston of the present invention is in no way immovably attached to any internal components and is thereby free to move in perfect concentricity within the cylindrical housing, the wear problems commonly associated with the known piston operated valves are avoided. Likewise, because the piston is not attached to the cylindrical housing, actuator failure commonly encountered with valves having fixed diaphragm actuators is eliminated.

Accordingly, the present invention provides solutions to the aforementioned problems encountered when using conventional rotary actuators. In particular, this invention provides a piston that is free floating, therefore, the problems encountered in using actuators with fixed diaphragms are alleviated. In addition, because the piston and other interior parts may be easily accessed without the use of hand tools by unthreading the cylindrical housing from the base member, lengthy repair and maintenance times are reduced.

BRIEF DESCRIPTION OF THE DRAWINGS

In the accompanying drawings, I have shown a present preferred embodiment of the invention wherein.

DETAILED DESCRIPTION OF THE PREFERRED EMBODIMENT

Referring now to the drawings wherein the showings are for purposes of illustrating the preferred embodiment of the present invention only and not for purposes of limiting same, the Figures show an actuator mechanism for imparting rotary control motion to devices having rotary control means wherein like reference numerals are employed among the various Figures to designate like elements but dissimilar numbers used to describe the components of the various embodiments of the invention are described as set forth hereinbelow.

Figure 1:
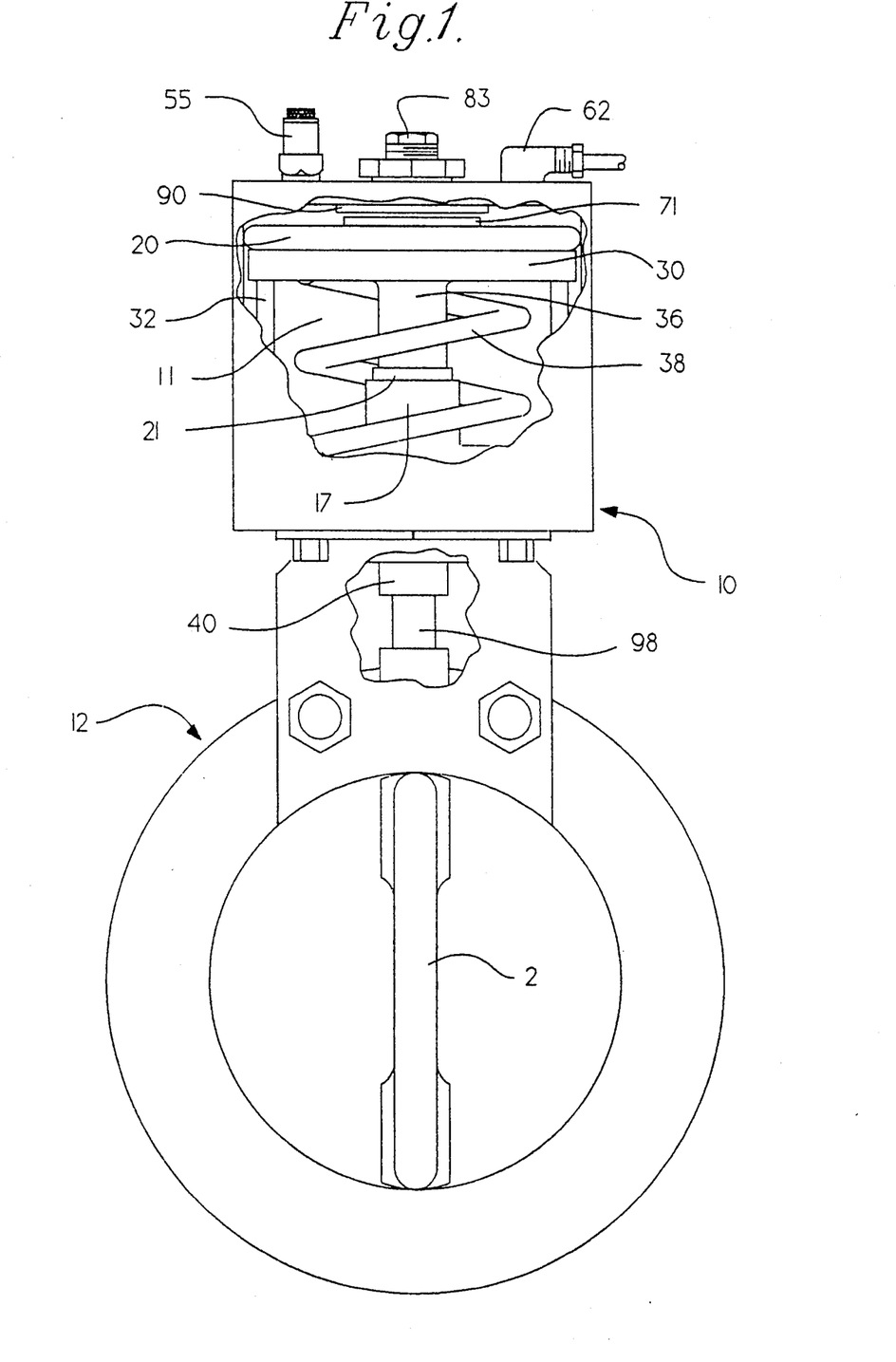
FIG. 1 is a side elevation and partial cutaway view of a spring biased rotary actuator of the present invention mounted to a butterfly valve.
Figure 2:
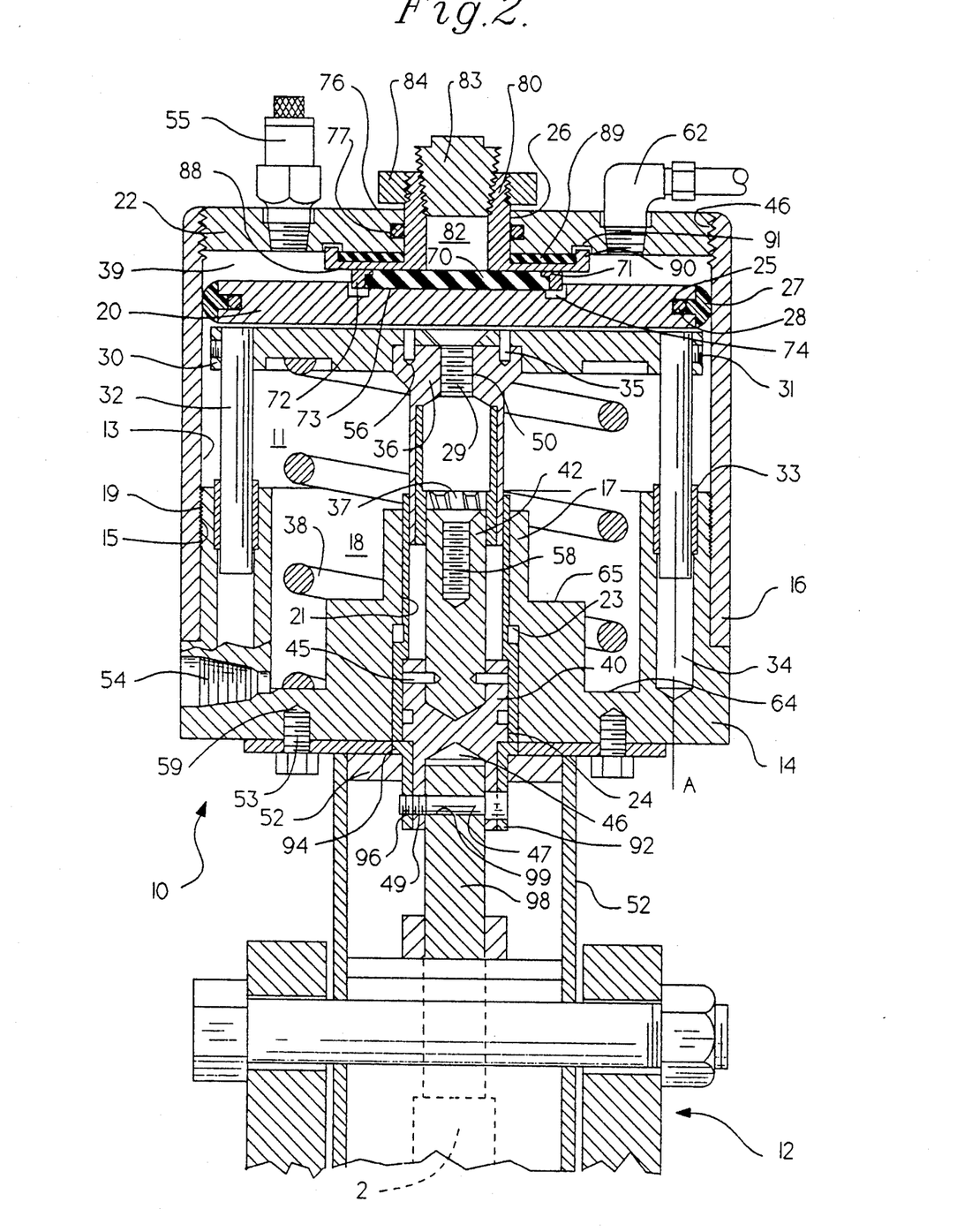
FIG. 2 is a cross-sectional side elevation view of a light duty, spring biased rotary actuator of the present invention mounted to a butterfly valve.

More particularly and with reference to FIG. 1, there is shown a first embodiment of an actuator mechanism 10 which may be used in light duty process control applications and may operate, for example, a rotary actuated butterfly valve 12 having a movable valve element 2. The actuator mechanism 10 consists of an actuator base 14 and housing 16 which, when assembled together, form cylindrical cavity 11. As can be seen in FIG. 2, housing 16 has a smooth interior cylindrical wall 13 and is capped on one end by end cap 22. In this embodiment, end cap 22 is threaded onto housing 16. Housing 16 further has an internal threaded portion 19 for threadably engaging a threaded section 15 on actuator base 14. Housing 16 and end cap 22 are preferably made of clear acrylic to permit viewing of the internal components while actuator 10 is in service. However, one of ordinary skill in the art will recognize that actuator housing 16 and end cap 22 may be fabricated from steel, aluminum, or other similar machinable materials from which a pressure chamber may be formed.

A free-floating piston 20 is concentrically positioned within housing 16 and is dimensioned so as to provide sliding engagement therewith. As shown in FIG. 2, a grooved recess 25 is provided in the perimeter of free-floating piston 20 for receiving a T-seal 27. T-seal 27 extends around the entire perimeter of free-floating piston 20 to provide an airtight seal between free-floating piston 20 and housing 16. T-seal 27 is preferably made of a material with a low coefficient of friction such as polytetrafluoroethylene, available from E. I. du Pont de Nemours Corporation under the trademark TEFLON ® and has a convex exterior surface to provide a low friction interface between free-floating piston 20 and smooth interior wall 13 of housing 16. In addition, a rubber O-ring 28 is preferably seated in grooved recess 25 to thereby provide a resilient biasing interface between free-floating piston 20 and T-seal 27.

Figure 9:
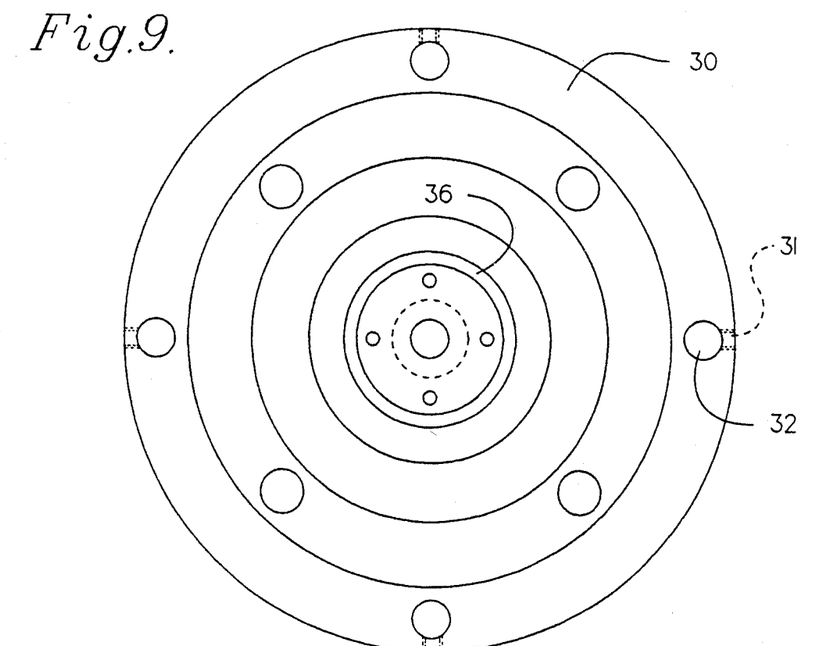
FIG. 9 is a bottom view of the piston support plate of the present invention.
Figure 14:
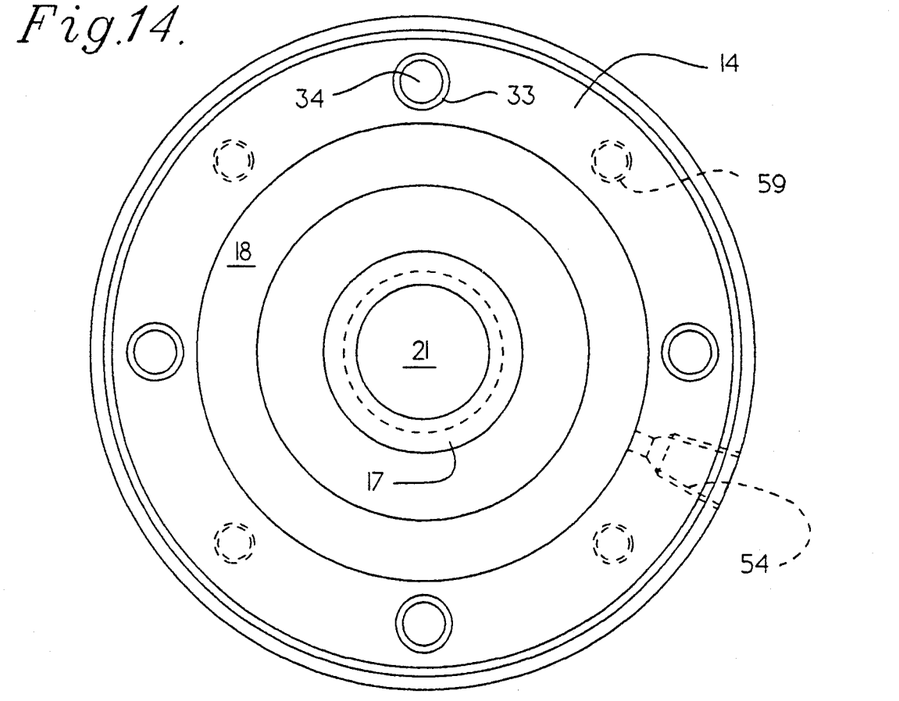
FIG. 14 is a top view of the base and housing of the actuator of FIGS. 2, 3 and 4.
Figure 15:
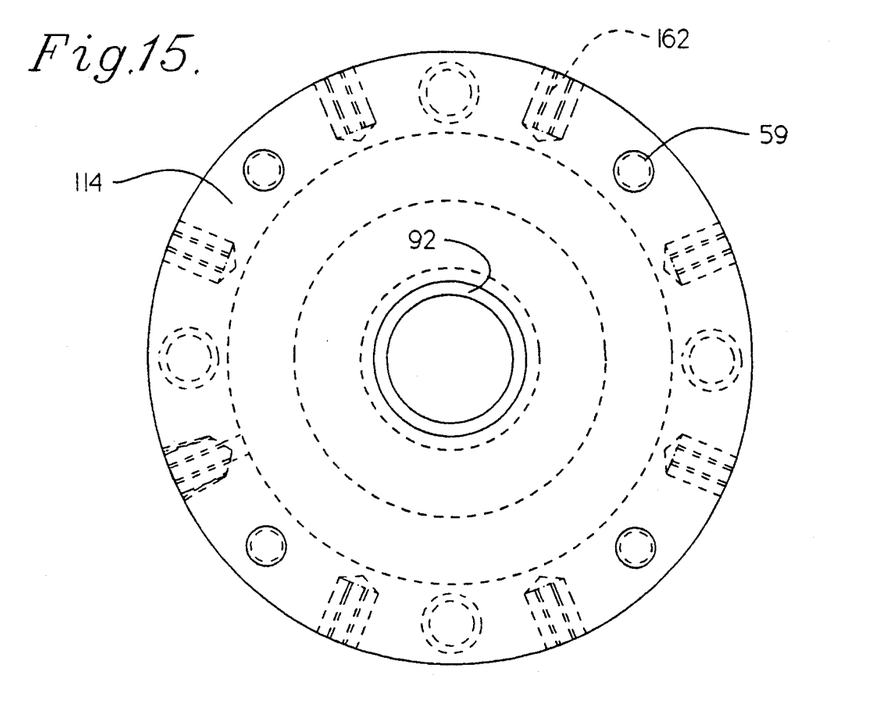
FIG. 15 is a bottom view of the base of the actuator of FIG. 4.

A piston support plate 30, as shown in FIGS. 2 and 9, is slideably attached to actuator base 14 and is contiguously positioned next to free-floating piston 20 within cavity 11. A plurality of torque guide rods 32, preferably four, are rigidly attached to a piston support plate 30 and extend perpendicularly therefrom toward base 14 and are slideably received in a corresponding number of guide rod bores 34 provided in base 14. Torque guide rods 32 are preferably attached to piston support plate 30 by set screws 31 but may be rigidly attached thereto by any suitable fastening means. Guide rod bores 34 are of sufficient length such that they provide torque guide rods 32 with the necessary range of motion along their respective axes A between base 14 and end cap 22. As can be seen in FIGS. 2 and 14, each guide rod bore 34 has a corresponding sleeve bearing 33 rigidly mounted therein for slideably receiving guide rods 32.

Figure 10:
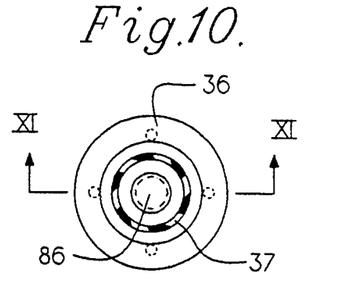
FIG. 10 is a bottom view of the helically splined receptacle of the present invention.
Figure 11:
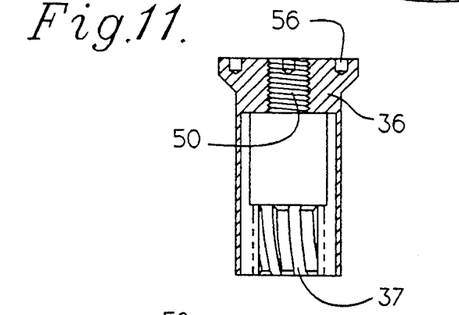
FIG. 11 is a section view of the helically splined receptacle of FIG. 10 taken along line XI—XI in FIG. 10.

As shown in FIGS. 2, 9 and 10, a receptacle 36, having an insert 37 with helically spiralled grooved recesses non-rotatably affixed therein, is rigidly attached to the center of piston support plate 30 and extends perpendicularly therefrom toward base 14. It will be recognized that insert 37 may be attached to receptacle 36 by a suitable, commercially available adhesive such as, for example, LOCKTITE ®, available from Locktite Corporation of Newington, CT. Receptacle 36 is preferably rigidly affixed to piston support plate 30 by a screw 29 that is threadedly received in a threaded bore 50 located in receptacle 36. In addition, a plurality of pins 35 may be received in a plurality of corresponding bores 56 located in receptacle 36 to prevent receptacle 36 from rotating with respect to piston support plate 30. However, receptacle 36 may be rigidly attached to piston support plate 30 by any suitable fastening means.

Actuator base 14, as illustrated in FIGS. 2 and 14, is preferably made of polypropylene rod having the same outer diameter as that of housing 16. However, it will be apparent to those of ordinary skill in the art that base 14 may be made of aluminum, steel or any similar machinable material to cooperate with housing 16. A spring cavity 18, having a bottom surface 64 and a stepped portion 65, is defined within base 14 by the area between the guide rod bores 34. A center portion 17 is vertically disposed within the spring cavity 18 and has an axial bore 21 extending therethrough that increases in diameter at step 23 to thereby enable a sleeve bearing 24 to be inserted therein.

Figure 12:
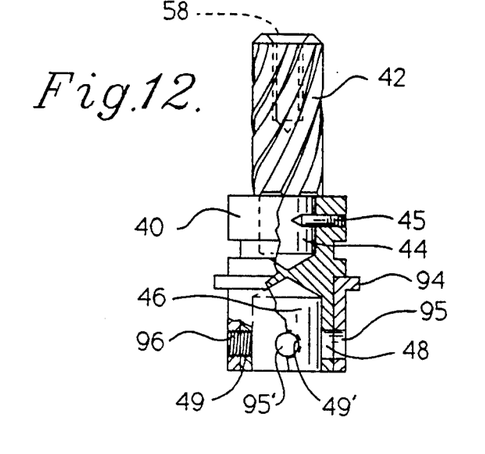
FIG. 12 is a partial sectional view of the coupling gland and helically splined shaft assembly of the present invention.
Figure 13:
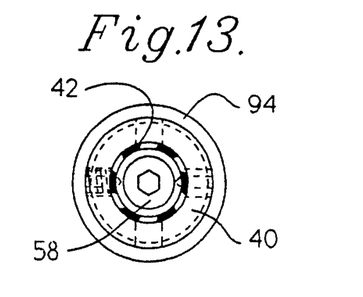
FIG. 13 is a top view of the coupling gland and helically splined shaft assembly of the present invention.

As shown in FIGS. 2 and 12, a coupling gland 40, preferably constructed of steel, is rotatably received in sleeve bearing 24. A helically grooved shaft 42 is rigidly attached to coupling gland 40 such that it protrudes from one end thereof. Coupling gland 40 is coaxially mounted within base 14 such that helically grooved shaft 42 substantially corresponds with helically spiralled grooved insert 37 in receptacle 36. In the preferred embodiment, one end of shaft 42 is received in a first axial cavity 44 of coupling gland 40 and is rigidly retained therein by pin 45. However, shaft 42 may be rigidly attached to coupling gland 40 by any suitable fastening means. A second axial cavity 46 is additionally provided in coupling gland 40 for receiving the control stem 98 of a rotary actuated device such as, for example, a butterfly valve 12. The portion of coupling gland 40 that extends through the bottom of actuator base 14 is slideably received in a flanged bushing 92. Bushing 92 is preferably constructed of brass, however, one of ordinary skill in the art will recognize that bushing 92 may be constructed out of any suitable low-friction material. As can be seen in FIG. 2, flange 94 of bushing 92 is rotatably fastened to the bottom of actuator base 14 by mounting bracket 52.

Figure 4:
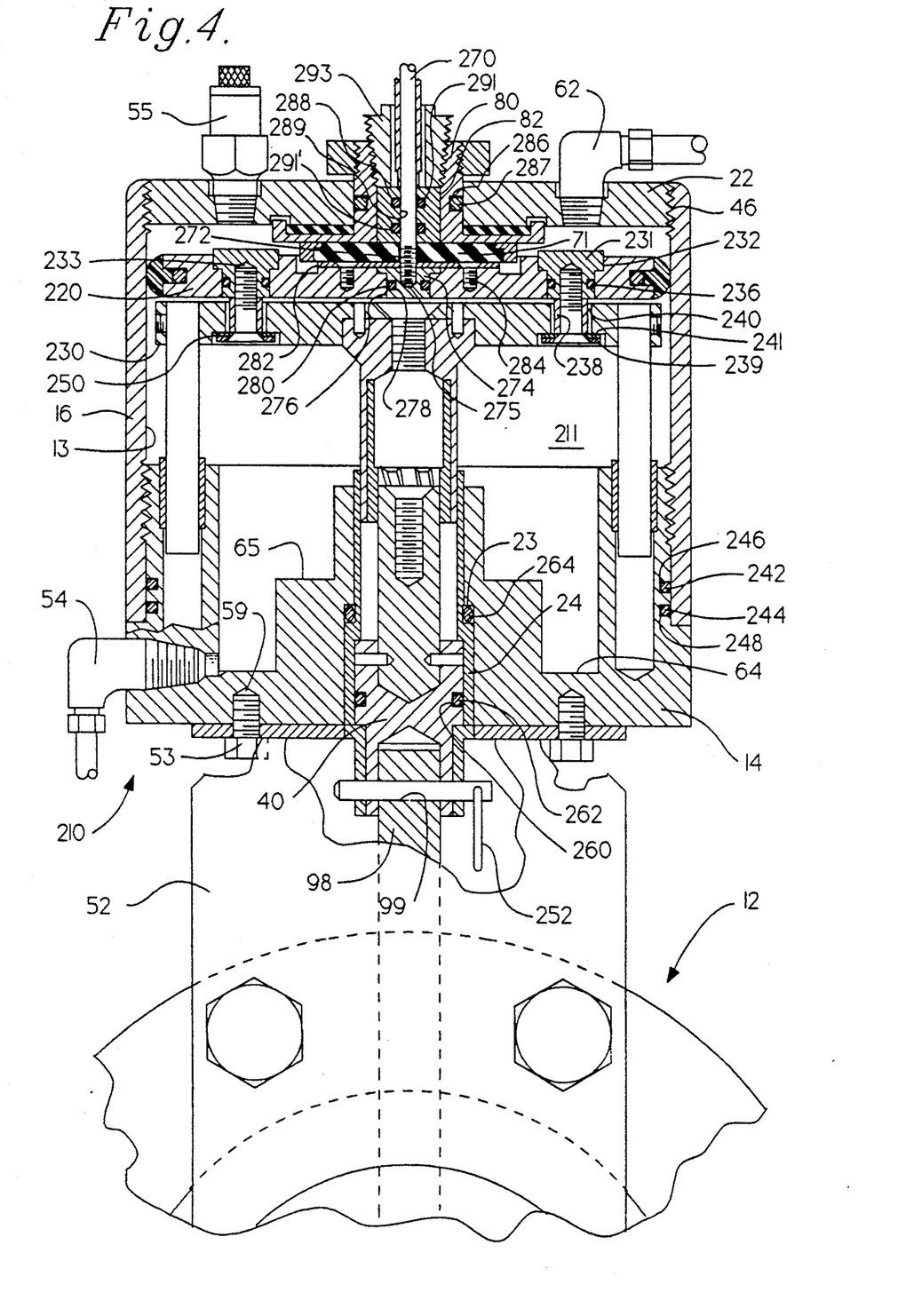
FIG. 4 is a cross-sectional front elevation view of a double acting rotary actuator of the present invention mounted to a butterfly valve.

In a preferred embodiment of the invention, as shown in FIGS. 2 and 12, the control stem 98 of the rotary actuated device 12 has an aperature 99 therethrough that substantially corresponds with mounting holes 48 and 49 located in coupling gland 40 and corresponding mounting holes 95 and 96 located in bushing 92. To attach the control stem 98 of the rotary controlled device 12 to coupling gland 40, a cap screw 47 is inserted through mounting holes 95 and 48 and the control stem aperature 99 and is threadably received in mounting holes 49 and 96. In addition, a second pair of mounting holes 48' and 49' and 95' and 96' are preferably arranged at right angles to holes 48 and 49 and 95 and 96 in coupling gland 40 and bushing 92 respectively, to thereby permit the control stem 98 to be rotated 90 degrees before being attached to coupling gland 40. When mounted to a butterfly valve 12, for example, the additional mounting capability afforded by holes 48', 49', 95' and 96' enables the downward stroke of free-floating piston 20 to either open or close the valve depending upon the orientation of the control stem 98 with respect to the coupling gland 40. In addition, as shown in FIG. 4, mounting holes 49 and 96 may be smooth and adapted to receive a quick release-type pin 252 to speed up the attachment process.

Figure 3:
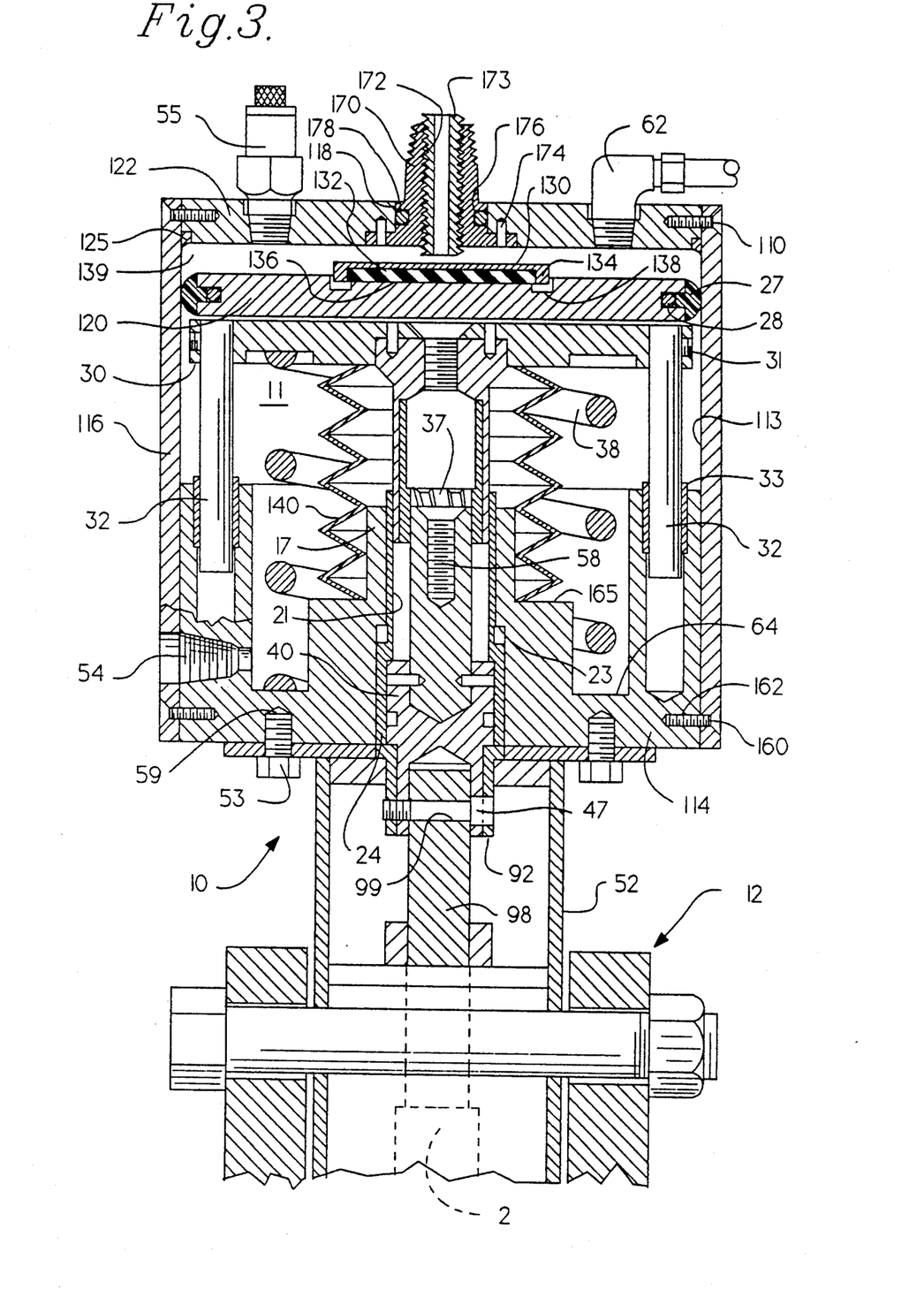
FIG. 3 is a cross-sectional side elevation view of a heavy duty rotary actuator with a nested spring biased return mounted to a butterfly valve.

Actuator 10 may be mounted to the rotary controlled device 12 by mounting bracket 52. As shown in FIGS. 2, 3, and 4, mounting bracket 52 is removably fastened to base 14 by capscrews 53 that are threadedly received in a corresponding number of threaded apertures 59 located in the bottom of actuator base 14. In the embodiments illustrated in FIGS. 2, 3, and 4, mounting bracket 52 is adapted to be secured to the flange assembly of a typical flange mounted butterfly valve 12. This mounting method utilizes the existing pipe flange bolts to secure the mounting brackets to the valve body. Those of ordinary skill in the art will recognize that mounting bracket 52 may be fastened to actuator base 14 by any suitable fastening means and may be provided in various configurations depending upon the type of rotary actuated device being utilized.

For actuating the free-floating piston 20 to impart control motion to control stem 98, a pressure medium is delivered from any suitable source through an inlet port 62 located in end cap 22 of housing 16. An exhaust port 54 is provided in base 14 for exhausting the entrapped air as free-floating piston progresses downward toward base 14. The pressure medium may consist of any fluid such as a liquid or gas which is capable of transmitting pressure and preferably consists of compressed air ranging from about 5-150 psig depending upon piston size and burst strength of housing 16. However, it will be recognized by those skilled in the art that alternative gas and hydraulic pressure mediums may also be used.

Before applying the pressure medium, free-floating piston 20 is forced to an upper portion of cavity 11 by a compression spring 38 acting in concert with piston support plate 30. As a result of the seal created between free floating piston 20 and housing 16, an airtight cavity 39 is created between free-floating piston 20 and end cap 22. Spring 38 is seated within spring cavity 18 such that it bears against piston support plate 30 causing it to move upward towards end cap 22. As the pressure medium is introduced, free-floating piston 20 and piston support plate 30 are forced rectilinealy downward along axis A toward base 14. This downward progression of piston support plate 30 causes receptacle 36 to engage with helically grooved shaft 42. Continued downward progression of receptacle 36 causes helically grooved shaft 42 and coupling gland 40 to rotate within sleeve bearing 24. This rotational motion is simultaneously transferred to the rotary actuated device 12 through its control stem 98 which is rigidly attached to coupling gland 40.

Torque guide rods 32 prevent piston support plate 30 from turning within cavity 11 in response to the torque created during the engagement between receptacle 36 and shaft 42. Torque guide rods 32 transfer this torque through base 14 to mounting bracket 52 where it is ultimately absorbed by the bolts or fasteners used to secure mounting bracket 52 to the rotary actuated device 12. Downward movement of receptacle 36 and its associated parts is limited by engagement with a stroke adjusting screw 58 that is threaded into the end of helically grooved shaft 42.

To reverse the actuation process, the flow of pressure medium into upper portion 39 is discontinued and vented therefrom whereupon spring 38 returns piston support plate 30 and free-floating piston 20 to the original starting position. The inlet port 62 may be piped to an electronically or manually operated valve switching device (not shown) to thereby permit the pressure medium that was introduced into airtight cavity 39 to alternately be exhausted through port 62. In this embodiment, an adjustable relief valve 55, capable of being adjusted between 25-200 psig, is preferably threaded into end cap 22. Relief valve 55 may be adjusted to vent air tight cavity 39 at various threshold pressures to thereby prevent actuator 10 from being damaged as a result of excessive pressure developed therein. Based on the present disclosure, one of ordinary skill in the art will recognize that helically wound compression springs, nested compression springs, wave springs or combination thereof or any other suitable biasing means may be utilized to return free-floating piston 20 to its original starting position.

As shown in FIG. 2, piston 20 preferably has a shock absorbing material 70 affixed thereto for absorbing the upward momentum of piston 20 during its return stroke. Shock absorbing material 70 is preferably fashioned out of silicone sponge rubber and is received in a cavity 73 that is centrally disposed in the upper portion of piston 20. A ring 71, having a leg 72 extending perpendicularly downward therefrom, is disposed around shock absorbing material 70 within cavity 73. A deeper cavity 74 extends around the perimeter of cavity 73 to thereby receive leg 72 of ring 71. Ring 71 rests on top of shock absorbing material 70 and is free-floating within cavity 74. Cavity 74, however, is deep enough to fully receive leg 72 when shock absorbing material 70 is fully compressed during the return stroke of free-floating piston 20.

Figure 16:
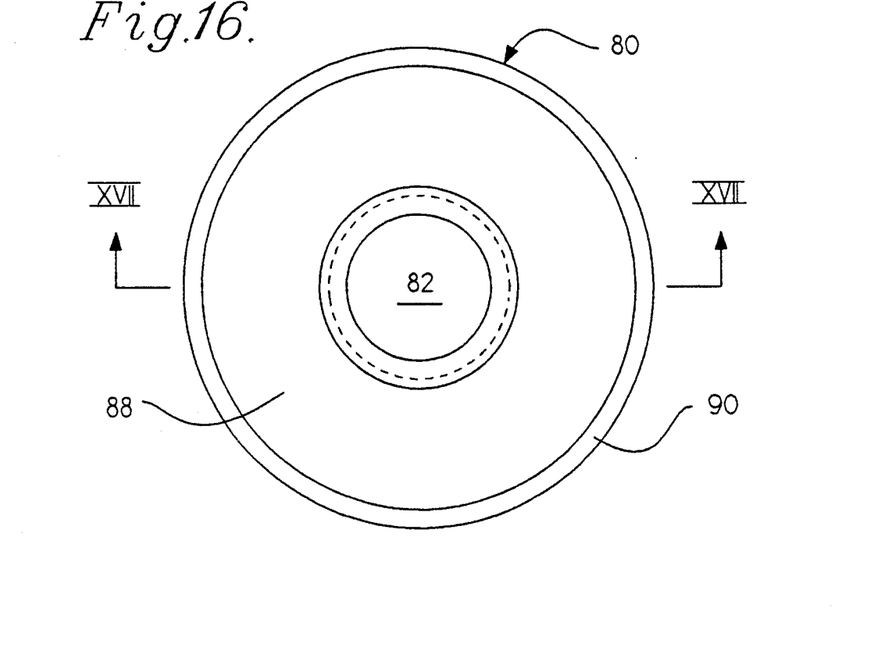
FIG. 16 is a top view of the shock absorbing bushing of the actuator of FIGS. 2 and 4.
Figure 17:
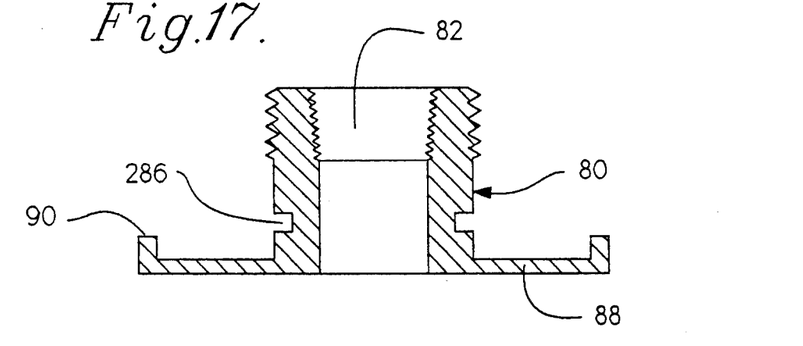
FIG. 17 is a cross-sectional view of the bushing of FIG. 16 taken along line XVII—XVII.

End cap 22 has a bore 26 centrally disposed therein that is adapted to slideably receive a bushing 80. As shown in FIGS. 2, 16, and 17, one end of bushing 80 is threaded to receive a retaining nut 84. Retaining nut 84 fastens bushing 80 to end cap 22 while permitting bushing 80 to slide within bore 26 in response to contact with free floating piston 20. Bushing 80 has an aperature 82 therethrough to provide an optional port into airtight cavity 39. The upper portion of aperture 82 is threaded to receive threaded plug 83 for applications in which an additional port is not needed.

A shock plate 88 extends from the other end of bushing 80 and substantially corresponds with shock absorbing material 70 and ring 71. Shock absorbing plate 88 has a leg 90 that perpendicularly depends from the perimeter thereof to substantially correspond with a cavity 91 located in end cap 22. A second shock absorbing material 89, preferably silicone sponge rubber, is provided between shock absorbing plate 88 and end cap 22. Cavity 91 is deep enough to fully receive leg 90 when second shock absorbing material 89 is compressed during the return stroke of free-floating piston 20.

In another embodiment of the present invention, primarily adapted for heavy-duty process control applications, as shown in FIG. 3, wherein the pressure encountered by a valve is great, end cap 122 is fastened to housing 116 by a plurality of countersunk flathead screws 110. It will be recognized that to achieve an airtight seal between end cap 122 and housing 116, any suitable commercially available sealant material 125 may preferably be applied to the interface therebetween. Housing 116 has a smooth interior cylindrical wall 113 and is similarly removably fastened to actuator base 114 by a plurality of countersunk flathead screws 160 that are received in a corresponding plurality of threaded apertures 162. In this embodiment, housing 116 and base 114 are preferably constructed from aluminum, however, one of ordinary skill in the art will recognize that housing 116 and base 114 may be constructed out of any material having similar burst strength properties.

Figure 5:
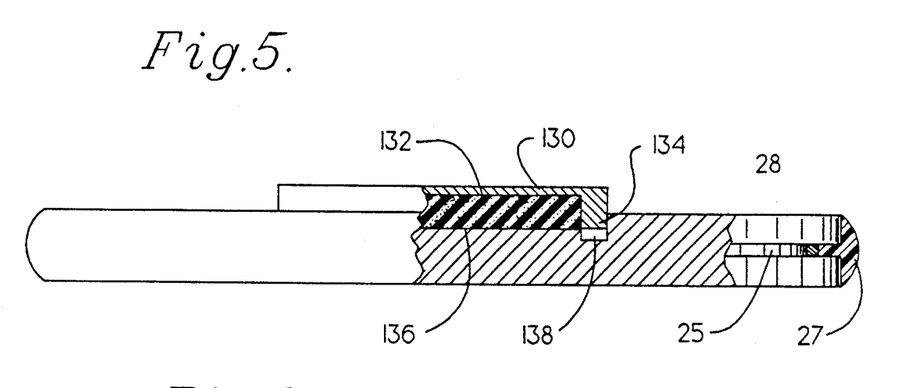
FIG. 5 is a side view and partial cutaway view of the free floating piston of the rotary actuator of FIGS. 2, 3, and 4.
Figure 6:
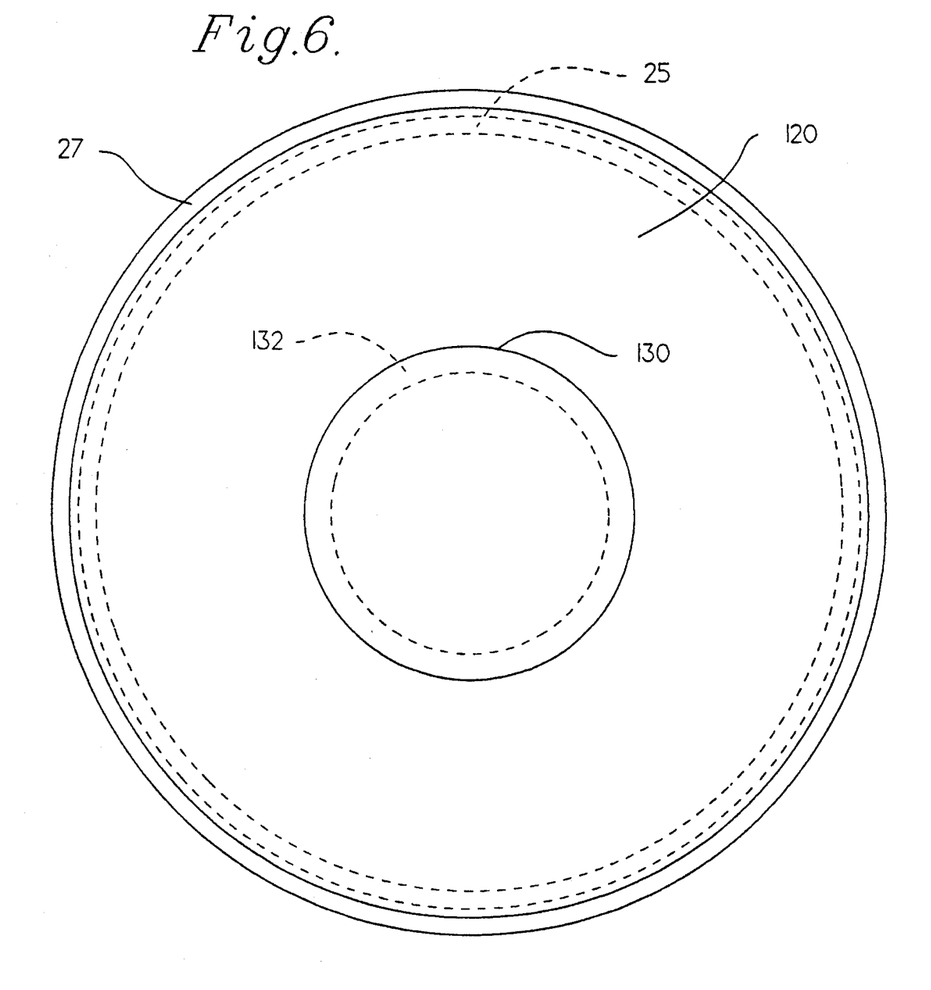
FIG. 6 is a top view of the free floating piston of the rotary actuator of FIGS. 2, 3 and 4.

In this embodiment, as shown in FIGS. 3, 5 and 6, a shock absorbing device consisting of a shock plate 130 and a shock absorbing material 132 may be utilized to absorb the upward momentum of piston 120 during its return stroke. Shock plate 130 is preferably constructed of metal such as steel or aluminum and has a leg 134 that perpendicularly depends from the perimeter thereof. Shock absorbing material 132, preferably silicone sponge rubber, is received in a cavity 136 that is centrally disposed in piston 120. A deeper cavity 138 extends around the perimeter of cavity 136 to thereby receive leg 134 of shock plate 130. Shock plate 130 is not rigidly attached to piston 12 and is thereby free to move axially within cavity 136. Cavity 138 is deep enough to fully receive leg 134 when shock absorbing material 132 is fully compressed during the return stroke of free floating piston 120.

Also in this embodiment, as shown in FIG. 3, a port fitting 170 having a threaded bore 172 therein is received in smooth bore 118 that is centrally disposed in end cap 122. Port fitting 170 is non-rotatably fastened to end cap 122 by a plurality of pins 174. Port fitting 170 has a radial groove 176 therein adapted to receive O-ring 178 to thereby ensure an airtight interface between port fitting 170 and end cap 122. A threaded rod 173 is threaded into threaded bore 172 to thereby limit the upward travel of piston 120. In this embodiment, the upward travel of piston 120 and the rotational motion resulting therefrom may easily be adjustably limited by advancing threaded rod 173 into or out of airtight cavity 139 to thereby cause it to contact shock plate 130 of free-floating piston 120. As illustrated in FIG. 3, threaded rod 173 may be hollow to provide an additional port into airtight cavity 139. Likewise, the portion of port fitting 114 that extends outward from end cap 122 may have a series of threads 171 adapted to receive, for example, a pressure gauge (not shown) to thereby monitor the pressure within airtight cavity 139.

FIG. 3 illustrates the nesting of one or a plurality of wave springs 140 within compression spring 38 that rest on step 165 of actuator base 114 as discussed hereinabove. It will be recognized that by varying the size and types of springs utilized in a nesting configuration, a very precise amount of spring return force can be achieved.

For applications requiring very precise actuator control, a double acting actuator mechanism 210 may be provided as shown in FIG. 4. Actuator mechanism 210 consists of actuator base 14 and housing 16 which, when assembled together form airtight cavity 211. Housing 16 has a smooth interior cylindrical wall 13 and is capped on one end by end cap 22 that threadably engages interior threaded portion 46 of housing 16. To ensure airtight engagement between housing 16 and base 14, O-rings 242 and 244 are respectively seated in radial grooves 246 and 248 provided in base 14.

Figure 7:
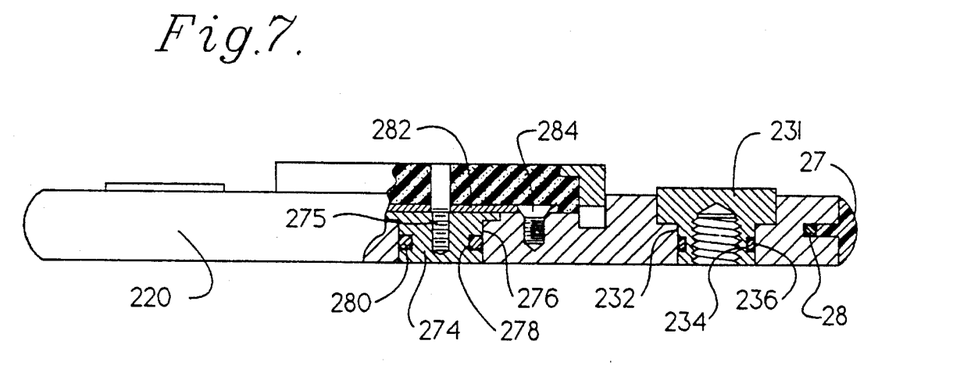
FIG. 7 is a side view and partial cutaway view of the semi-free-floating piston of the rotary actuator of FIG. 4.
Figure 8:
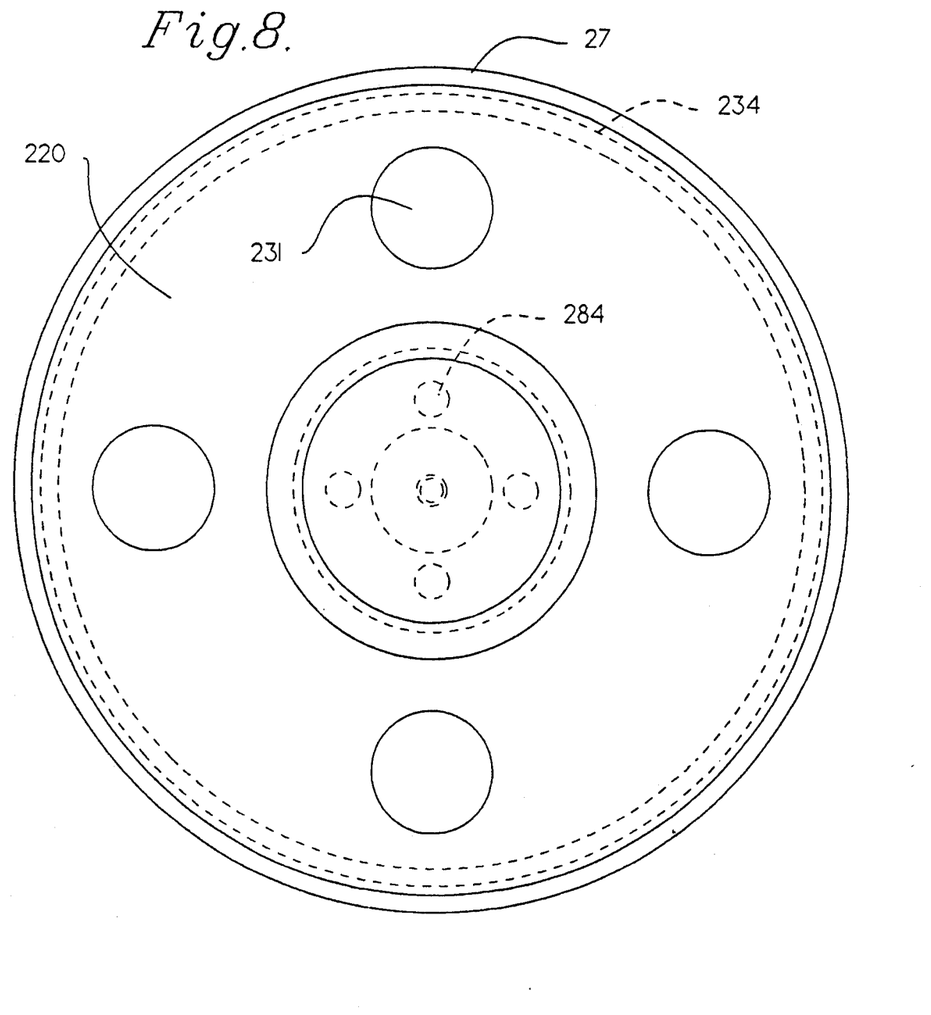
FIG. 8 is a top view of the semi-free-floating piston of the rotary actuator of FIG. 4.

In this embodiment, piston 220 is moved toward end cap 22 by admitting a pressure medium through a port 54 located in base 14. It will be understood by one of ordinary skill in the art that at least one four-way solenoid (not shown) may be utilized to simultaneously switch the pressure between port 62 and port 54. As shown in FIGS. 4, 7 and 8, piston 220 is movably attached to piston support plate 30 such that piston support plate may move laterally or rotate approximately 0.030" without effecting the airtight seal between piston 220 and housing 16. To accomplish such movable attachment, fastening nuts 231, preferably four in number, are securely received in corresponding cavities 232 located in piston 220. As most particularly shown in FIG. 7, each fastening nut 231 has a radial groove 234 therein adapted to receive O-ring 236 to create an airtight seal between fastening nut 231 and piston 220. As shown in FIG. 4, a corresponding number of threaded fasteners 238, having an enlarged cap portion 239 affixed thereto, extend through bores 240 located in piston support plate 230 and are threadably received in threaded cavities 233 located in each fastening nut 231. Bores 240 are larger in diameter than threaded fasteners 238 and increase in diameter at step 241 to thereby freely accommodate cap portion 239 of threaded fastener 238. Therefore, the amount of longitudinal piston support plate movement with respect to piston 220 may be easily adjusted by varying the amount of threaded engagement between fastening nut 231 and threaded fastener 238. In addition, a plurality of TEFLON ® thrust washers 250, such as those available from DuPont DeNemours Corporation are provided between fasteners 238 and support plate 230 to enhance the freefloating capabilities of piston 220.

In order to ensure that cavity 211 is airtight, coupling gland 40 has a radial groove 260 therein that is adapted to receive O-ring 262. O-ring 262 provides an airtight seal between coupling gland 40 and sleeve bearing 24. In addition, an O-ring 264 is further provided at step 23 to create an airtight seal between actuator base 14 and sleeve bearing 24.

As mentioned hereinabove, double acting actuator mechanism 210 is well suited for process control applications that require precise rotary control. By controlling the amount of pressure medium entering into airtight cavity 211 on one side of piston 220 while simultaneously controlling the amount of pressure medium being exhausted from the other side of piston 220, the linear travel of piston 220 may be accurately maintained and controlled. It will be understood that by regulating the linear travel of piston 220, the resulting rotary motion may be controlled to the point where, for example, a valve may be partially held open or closed at various precise angular orientations.

For applications of this type, I have found that a characterizable pneumatic positioner of the type manufactured by, for example, Bailey Meter Company to be well suited for controlling and balancing the pressure differential created across piston 220.

In this type of application, a position transmitting device is required to communicate the position of piston 220 back to the characterizable pneumatic positioner. In the embodiment illustrated in FIGS. 4 and 20, a flexible cable 270 is utilized to transmit the motion of piston 220 back to a pneumatic positioner generally designated as 300. However, one of ordinary skill in the art will recognize that other forms of motion transmitting devices such as, for example, rods or levers may be used.

Figures 20, 21:
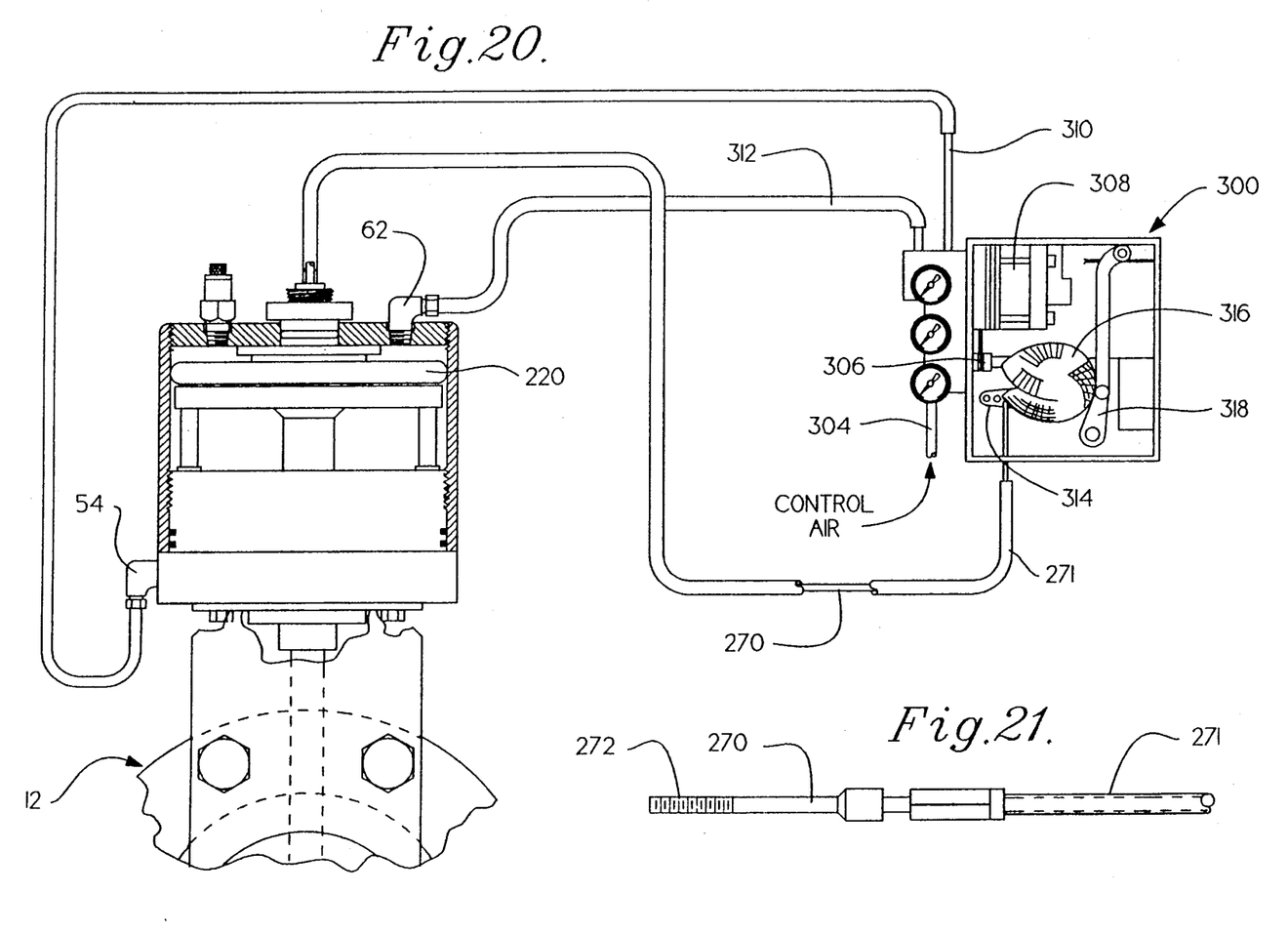
FIG. 20 is an elevational and partial cutaway view of a dual acting actuator of the present invention with a cable controlled characterizable pneumatic positioner.
FIG. 21 is an enlarged view of one end of the control cable of FIG. 16.

As shown in FIG. 21, cable 270 has a threaded end portion 272, and is slideably received in a flexible sheath 271. I have found that the DURAGLIDE TM cable system manufactured by Arens Control to be well adapted for this application. As shown in FIGS. 4 and 7, threaded end 272 of cable 270 is connected to piston 220 by flanged nut 274. Flanged nut 274 is received in a corresponding cavity 276 that is centrally disposed in piston 220 and is retained therein by mounting plate 282. Mounting plate 282 is removably fastened to piston 220 by a plurality of countersunk flathead screws 284. To ensure that an airtight seal between flanged nut 274 and piston 220 is achieved, an O-ring 280 is received in a radial groove 278 located in flanged nut 274.

Figure 18:
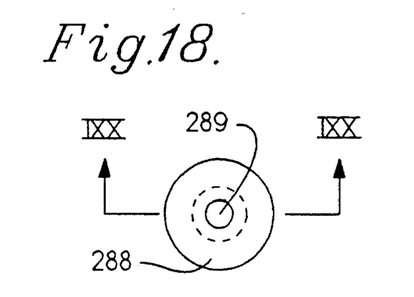
FIG. 18 is a top view of the gland fitting of the actuator of FIG. 4.
Figure 19:
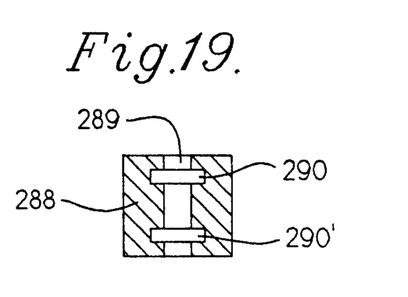
FIG. 19 is a cross-sectional view of the gland fitting of FIG. 18 taken along line IXX—IXX.

In this embodiment, as shown in FIGS. 4 and 16, bushing 80 additionally has a radial groove 286 adapted to receive O-ring 287 which provides an airtight sliding interface between bushing 80 and end cap 22. As shown in FIGS. 4, 18 and 19, a hollow gland fitting 288, having a smooth bore 289 therethrough, is slideably received in axial bore 82 located in bushing 80 and is retained therein by hollow plug 293 (See FIGS. 4, 18 and 19). Threaded end 272 of cable 270 extends through hollow plug 293, gland fitting 288 and shock absorbing material 70 to be threadedly received in threaded bore 275 located in flanged nut 274.

Smooth bore 289 of gland fitting 288 is of sufficient diameter so as to permit cable 270 to freely slide therethrough in response to the travel of piston 220. In the preferred embodiment, the smooth bore 289 of gland fitting 288 is smaller in diameter than cable sheath 271 to thereby prevent cable sheath 271 from entering therein. To ensure that an airtight sliding fit is created between cable 270 and gland fitting 288, gland fitting has two interior grooves 290 and 290' adapted to receive O-rings 291 and 291'.

As shown in FIG. 20, the other end of cable 270 is adapted to be fastened to, for example, a drive arm 314 of a characterizable pneumatic positioner 300. The control pressure that is ultimately supplied to the actuator mechanism 210 is supplied to positioner 300 through conduit 304 from an external source of compressed air (not shown). When rotary control motion for operating the rotary cntrolled device 12 is required that would, for example, necessitate the advancement of piston 220 to the upper portion of airtight cavity 211, the input control pressure entering positioner 300 must be increased. By increasing the input control pressure, signal diaphragm assembly 306 is displaced in such a manner so as to cause relay assembly 308 to permit additional air pressure to pass through pipe 310 and port 54. Relay assembly 308 also simultaneously causes conduit 312 to be vented to atmosphere causing the air entrapped in the portion of cavity 211 that is above piston 210 to exhaust through port 62. Piston 220 is displaced within housing 16 due to the resulting pressure differential created across piston 220. Movement of piston 220 is transmitted back to positioner 300 by cable 270 which is connected to positioner drive arm 314 and cam 316 causing cam 316 to rotate. The rotation of cam 316 actuates follower assembly 318 which is connected to diaphragm assembly 306 by a spring (not shown). When the resulting spring force being exerted on diaphragm assembly 306 equals the amount of opposing force being exerted thereon by the input control pressure, a balanced condition is achieved within diaphragm assembly 306. When in this balanced condition, relay assembly 308 will cause all pressure medium flow within pipes 310 and 312 to cease by closing a pair of valves located therein (not shown), which causes the pressure on both sides of piston 220 to be in equilibrium with the input control signal pressure. It will be understood that a decreasing input control pressure reverses the sequence described hereinabove causing piston 220 to move in the opposite direction.

It will be understood that various changes in the details, materials and arrangements of parts which have been herein described and illustrated in order to explain the nature of the invention, may be made by those skilled in the art within the principle and scope of the invention as expressed in the appended claims. For example, although the actuator is described in terms of rotary output, it is possible through modification of the output mechanism to provide an actuator with a linear output. The helically grooved shaft 42 may be replaced with a shaft that is rigidly attached to the receptacle 36. Such an output mechanism would provide linear output instead of rotary output.

What is claimed is:

1. Apparatus for generating a mechanical control output, comprising:
   a. a housing having a cylindrical cavity therein having a sealed first end and a second end;
   b. a free floating piston movably and concentrically disposed and laterally unrestrained within said cavity in pressure sealing engagement therewith, said piston being configured for movement along the axis of said cavity, said piston having a first side facing said first end of said cavity and a second side;
   c. a piston support member positioned in said cavity adjacent to said second side of said piston and concentric with said piston;
   d. an output member connected to the piston support member and extending from said piston support member and through the second end of the cavity;
   e. inlet means for providing pressurized fluid in said cavity in the area between said first end of said cavity and said first side of said piston;
   f. exhaust means for allowing pressurized fluid to exhaust from the area between said first end of said cavity and said first side of said piston; and
   g. means for urging said piston toward said first end of said cavity.

2. The apparatus of claim 1 wherein said output member comprises a shaft member having a plurality of helically spiralled splines thereon, said splines substantially corresponding with a plurality of splined recesses in a receptacle member rigidly attached to said support member.

3. The apparatus of claim 2 further comprising a base member closing said second end of said housing, said base member being removably attached to said housing.

4. The apparatus of claim 3 wherein said urging means comprises at least one spring means connected between said base member and said piston support member.

5. The apparatus of claim 4 wherein said free-floating piston additionally comprises a low friction mating member perimetrically and flexibly connected to said free-floating piston, said mating member having a radiused exterior surface for creating a slidable and airtight interface between said free-floating piston and said housing.

6. The apparatus of claim 5 wherein said second end of said cylindrical cavity is threadably attached to said base member.

7. The apparatus of claim 6 wherein said housing comprises a transparent acrylic cylinder.

8. The apparatus of claim 7 wherein said piston support member is slideably connected to said base member by a plurality of guide rods which are parallel to the axis of said cavity, each said guide rod having an upper and lower portion, said upper portion being rigidly connected to said piston support member and said lower portion being slidably connected to said base member.

9. The apparatus of claim 8 wherein said base member has a plurality of bores therein, said bores substantially corresponding to said guide rods such that said guide rods are slidably received therein to enable said piston support member to slidably respond to said travel of said free floating piston.

10. The apparatus of claim 9 additionally comprising travel restricting means for limiting the linear stroke of said free floating piston.

11. The apparatus of claim 10 wherein said travel restricting means includes an adjustable stop member threadably attached to said shaft member to limit the linear stroke of said free floating piston.

12. The apparatus of claim 11 additionally comprising means for cushioning said free-floating piston as said piston is returned toward said first end of said cavity.

13. The apparatus of claim 12 wherein said urging means comprises at least one helically wound spring and at least one wave spring each connected intermediate said piston support member and said base member.

14. The apparatus of claim 13 further comprising means for regulating the pressure of said pressure fluid to a predetermined incoming pressure.

15. The apparatus of claim 14 further comprising gauge means for indicating the pressure of said pressurized fluid.

16. Apparatus for generating a rotary mechanical control output, comprising:
   a. a housing having a cylindrical cavity therein having a sealed first end and a second end;
   b. a base member closing and being releasably attached to said second end of said housing;
   c. a free floating piston movably and concentrically disposed and laterally unrestrained within said cavity in pressure sealing engagement therewith, said piston being configured for movement along the axis of said cavity, said piston having a first side and second side, said piston having a mating member perimetrically and flexibly connected thereto to thereby create a slidable and airtight interface between said free-floating piston and said housing;
   d. inlet means for providing pressurized fluid in said cavity in the area between said first end of said cavity and said first side of said piston;
   e. a piston support member positioned in said cavity adjacent to said second side of said piston and concentric with said piston, said piston support member being slidably connected to said base member by a plurality of guide rods, said guide rods each having an upper portion rigidly attached to said piston support member and a lower portion slidably received in corresponding guide rod cavities in said base member;
   f. a shaft member having a plurality of helically spiralled splines thereon, said splines substantially corresponding with a plurality of splined recesses in a receptacle member, said receptacle being rigidly attached to said support member;
   g. means for urging said piston toward said first end of said cavity; and
   h. exhaust means for allowing pressurized fluid to exhaust from the area between said first end of said cavity and said first side of said piston.

17. Apparatus for generating a mechanical control output, comprising:

a. a housing having a cylindrical cavity therein having a sealed first end and a second end;

b. a base member sealing and being releasably attached to the second end of said housing;

c. a free floating piston movably and concentrically disposed and laterally unrestrained within said cavity in pressure sealing engagement therewith, said piston being configured for movement along the axis of said cavity, said piston having a first side facing said first end of said cavity and a second side;

d. first inlet means for allowing pressurized fluid to enter into and exhaust from the area between said first end of said cavity and said first side of said piston;

e. a piston support member having a front side and a rear side, the front side of said piston support member being concentrically and movably attached to said second side of said free floating piston within said cavity;

f. an output member connected to the piston support member and extending from said piston support member and through said base member;

g. second inlet means for permitting a pressurized fluid to enter into and exhaust from said cavity in the area between said piston support plate and said second end of said cavity; and h. means for controlling said first inlet means and said second inlet means.

18. The apparatus of claim 17 wherein said output member comprises a shaft member having a plurality of helically spiralled splines thereon, said splines substantially corresponding with a plurality of splined recesses in a receptacle member rigidly attached to said support member.

19. The apparatus of claim 17 wherein said free-floating piston additionally comprises a low friction mating member perimetrically and flexibly connected to said free-floating piston, said mating member having a radiused exterior surface for creating a slidable and airtight interface between said free-floating piston and said housing.

20. The apparatus of claim 17 wherein said housing comprises a transparent acrylic cylinder.

21. The apparatus of claim 17 wherein said piston support member is slideably connected to said base member by a plurality of guide rods which are parallel to the axis of said cavity, each said guide rod having an upper and lower portion, said upper portion being rigidly connected to said piston support member and said lower portion being slidably connected to said base member.

22. The apparatus of claim 17 wherein said control means further comprises means for maintaining said piston in a preselected position.

* * * * *

UNITED STATES PATENT AND TRADEMARK OFFICE
CERTIFICATE OF CORRECTION

PATENT NO. : 5,170,693
DATED      : December 15, 1992
INVENTOR(S): Gary M. Stary It is certified that error appears in the above-identified patent and that said Letters Patent is hereby corrected as shown below:

In the Abstract, line 4, delete "movable" and substitute therefor --movably--.

Col. 6, line 42, delete "rectilinealy" and substitute therefor --rectilinearly--.

Col. 10, line 37, delete "cntrolled" and substitute therefor --controlled--.

Signed and Sealed this

Thirtieth Day of November, 1993

Attest:

BRUCE LEHMAN

Attesting Officer

Commissioner of Patents and Trademarks